(12) United States Patent
Krishnamurthy et al.

(10) Patent No.: US 8,433,249 B2
(45) Date of Patent: Apr. 30, 2013

(54) INTERFERENCE REDUCTION FOR TERMINALS OPERATING IN HETEROGENEOUS WIRELESS COMMUNICATION NETWORKS

(75) Inventors: Sandeep H. Krishnamurthy, Arlington Heights, IL (US); Robert T. Love, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 164 days.

(21) Appl. No.: 12/909,043

(22) Filed: Oct. 21, 2010

(65) Prior Publication Data

US 2011/0111779 A1     May 12, 2011

Related U.S. Application Data

(60) Provisional application No. 61/259,009, filed on Nov. 6, 2009.

(51) Int. Cl.
*H04B 1/00*     (2006.01)
*H04B 15/00*     (2006.01)

(52) U.S. Cl.
USPC .......................... 455/63.1; 455/63.3

(58) Field of Classification Search ................ 455/522, 455/63.1, 63.3, 67.11, 67.13, 114.2, 115.1, 455/278.1, 296
See application file for complete search history.

(56) References Cited

U.S. PATENT DOCUMENTS

| | | | |
|---|---|---|---|
| 6,594,240 B1 | 7/2003 | Chuah et al. | |
| 7,940,740 B2 | 5/2011 | Krishnamurthy et al. | |
| 2005/0271387 A1 | 12/2005 | Kee et al. | |
| 2006/0293060 A1 | 12/2006 | Yang et al. | |
| 2007/0173260 A1 | 7/2007 | Love et al. | |
| 2007/0173276 A1 | 7/2007 | Love et al. | |
| 2008/0025254 A1 | 1/2008 | Love et al. | |
| 2008/0220807 A1 | 9/2008 | Patel et al. | |
| 2008/0280638 A1 | 11/2008 | Malladi et al. | |
| 2009/0109939 A1 | 4/2009 | Bhushan et al. | |
| 2009/0197631 A1 | 8/2009 | Palanki et al. | |
| 2009/0207793 A1 | 8/2009 | Shen et al. | |
| 2009/0227263 A1 | 9/2009 | Agrawal et al. | |
| 2009/0257390 A1 | 10/2009 | Ji et al. | |
| 2009/0262854 A1 | 10/2009 | Lee et al. | |

(Continued)

FOREIGN PATENT DOCUMENTS

| | | |
|---|---|---|
| EP | 1909523 A1 | 4/2008 |
| GB | 2404113 A | 1/2005 |

(Continued)

OTHER PUBLICATIONS

Motorola: "Heterogeneous Support for Reliable Downlink Control", 3GPP TSGRAN WG4 Meeting #52, R4-093220, Shenzhen, China Aug. 24-28, 2009, all pages.

(Continued)

*Primary Examiner* — Eugene Yun

(57) ABSTRACT

A wireless communication infrastructure entity in a wireless communication system implementing an uplink control channel using a narrowband frequency resource within a wideband frequency resource. The entity includes a controller communicably coupled to the transceiver wherein the controller is configured to cause the transceiver to signal a location for an uplink control channel within the wideband frequency resource. The uplink control channel includes at least a pair of uplink control channels separated within the wideband frequency resource and accommodates simultaneous uplink transmissions by multiple user equipment communicating in the wireless communication system.

9 Claims, 5 Drawing Sheets

U.S. PATENT DOCUMENTS

| | | | |
|---|---|---|---|
| 2010/0027484 | A1 | 2/2010 | Imamura et al. |
| 2010/0029289 | A1 | 2/2010 | Love et al. |
| 2011/0110240 | A1 | 5/2011 | Bergquist et al. |

FOREIGN PATENT DOCUMENTS

| | | | |
|---|---|---|---|
| JP | 2000-209661 A | | 7/2000 |
| WO | 2008039034 A2 | | 4/2008 |
| WO | 2008041582 A1 | | 4/2008 |
| WO | 2009026162 A1 | | 2/2009 |
| WO | 2009035983 A1 | | 3/2009 |

OTHER PUBLICATIONS

3GPP TS 36.211 V9.1.0 (Mar. 2010), 3rd Generation Partnership Project; Technical Specification Group Radio Access Network; Evolved Universal Terrestrial Radio Access (E-UTRA); Physical Channels and Modulations (Release 9), all pages.

Xiang Chen et al.: "Coexistence Analysis Involving 3GPP Long Term Evolution", Vehicular Technology Conference, 2007, VTC-2007 Fall, 2007 IEEE 66th, IEEE, PI, Sep. 1, 2007, pp. 225-229.

LG Electronics Inc.: "Efficient Utilization of Unused PUCCH RB", 3GPP Draft; R1-082438 Efficient Utilization of Unused PUCCH RB, 3rd Generation Partnership Project (3GPP), Mobile Competence Centre; 650, Route Des Lucioles; F-06921 Sophia-Antipolis Cedex, France, vol. RAN WG1, no. Warsaw, Poland, Jun. 24, 2008, all pages.

3GPP TSG-RAN WG1 #54, R1-083195, "Range expansion for efficient support of heterogeneous networks", Qualcomm Europe, Jeju, S. Korea, Aug. 18-22, 2008, all pages.

R4-080710; 3GPP TSG RAN WG4 (Radio) Meeting #46bis; Shenzhen, People Republic of China; Mar. 31 to Apr. 4, 2008; 12 pages.

R4-081112; 3GPP TSG RAN WG4 (Radio) Meeting #46bis; Kansas City, USA; May 5 to May 9, 2008; 10 pages.

Patent Cooperation Treaty, "PCT Search Report and Written Opinion of the International Searching Authority" for International Application No. PCT/US2010/054690 Feb. 3, 2011, 13 pages.

3GPP TR 36.9xx 0.2.0 (Mar. 2009) Technical Report 3rd Generation Partnership Project; Technical Specification Group Radio Access Networks; LTE FDD Home eNodeB RF Requirements Work Item Technical Report (Release 9) 24 pages.

United States Patent and Trademark Office "Non-Final Rejection" for U.S. Appl. No. 12/184,235 dated Mar. 14, 2012, 14 pages.

United States Patent and Trademark Office "Non-Final Rejection" U.S. Appl. No. 12/829,534 dated Mar. 28, 2012, 9 pages.

United States Patent and Trademark Office "Non-Final Rejection" for U.S. Appl. No. 12/184,235 dated Sep. 23, 2011, 11 pages.

3GPP TSG RAN WG1 #51, R1-074661 "Clarification of CQI/PMI/rank reporting mechanisms on PUCCH/PUSCH", Sharp, Jeju, Korea, Nov. 5-9, 2007, 3 pages.

Krishnamurthy et al., "Signaling Femto-Cell Deployment Attributes to Assist Interference Mitigation in Heterogeneous Networks" U.S. Appl. No. 12/829,534, filed Jul. 2, 2010.

Patent Cooperation Treaty, "PCT Search Report and Written Opinion of the International Searching Authority" for International Application No. PCT/US2010/036315 Nov. 2, 2010, 15 pages.

Korean Intellectual Property Office, Non-Final Office Action for Korean Patent Application No. 10-2011-7002317 dated Jun. 26, 2012, 4 pages.

United States Patent and Trademark Office "Final Rejection" U.S. Appl. No. 12/829,534, dated Dec. 7, 2012, 13 pages.

INTERFERENCE REDUCTION FOR TERMINALS OPERATING IN HETEROGENEOUS WIRELESS COMMUNICATION NETWORKS

CROSS REFERENCE TO RELATED APPLICATION

The present application is a non-provisional application of U.S. provisional Application No. 61/259,009 filed on 6 Nov. 2009, the contents of which are incorporated by reference herein and from which benefits are claimed under 35 U.S.C. 119.

FIELD OF THE DISCLOSURE

The present disclosure relates generally to wireless communications and more particularly to interference reduction on the uplink and control channel performance improvement in wireless communication systems.

BACKGROUND

Some wireless communication networks are completely proprietary, while others are subject to one or more standards to allow various vendors to manufacture equipment for a common system. One standards-based network is the Universal Mobile Telecommunications System (UMTS), which is standardized by the Third Generation Partnership Project (3GPP). 3GPP is a collaborative effort among groups of telecommunications associations to make a globally applicable Third Generation (3G) mobile phone system specification within the scope of the International Mobile Telecommunications-2000 project of the International Telecommunication Union (ITU). The UMTS standard is evolving and is typically referred to as UMTS Long Term Evolution (LTE) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or non-contiguous and the downlink data modulation may be performed using quadrature phase shift-keying (QPSK), 16-ary quadrature amplitude modulation (16QAM), or 64QAM. The OFDM symbols are configured into a downlink subframe for transmission from the base station. Each OFDM symbol has a temporal duration and is associated with a cyclic prefix (CP). A cyclic prefix is essentially a guard period between successive OFDM symbols in a sub frame. According to the E-UTRA specification, a normal cyclic prefix is about five (5) microseconds and an extended cyclic prefix is about 16.67 microseconds. The data from the serving base station is transmitted on a physical downlink shared channel (PDSCH) and the control information is signaled on physical downlink control channel (PDCCH).

In contrast to the downlink, uplink communications from the UE to the eNB utilize single-carrier frequency division multiple access (SC-FDMA) according to the E-UTRA standard. In SC-FDMA, block transmission of QAM data symbols is performed by first Discrete Fourier Transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling grants (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions. The UE transmits data on the physical uplink shared channel (PUSCH). The physical control information is transmitted by the UE on the physical uplink control channel (PUCCH).

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator, or the number of data streams sent on the same resources, precoding matrix index (PMI), and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or sub-band frequency selective information of the parameters. The eNB may use the rank information, the CQI, and other parameters, such as uplink quality information, to serve the UE on the uplink and downlink channels.

A home-base station or femto-cell or pico-eNB or relay node (RN) is referred to as a hetero-eNB (HeNB) or a hetero-cell or hetero base station in the sequel. A HeNB can either belong to a closed subscriber group (CSG) or can be an open-access cell. A CSG is a set of one or more cells that allow access only to certain group of subscribers. HeNB deployments where at least a part of the deployed bandwidth (BW) is shared with macro-cells are considered to be high-risk scenarios from an interference point-of-view. When UEs connected to a macro-cell roam close to a HeNB, the uplink of the HeNB can be severely interfered with particularly when the HeNB is far away (for example >400 m) from the macro-cell, thereby, degrading the quality of service of UEs connected to the HeNB. Currently, the existing Rel-8 UE measurement framework can be made to identify situations when this interference might occur and the network can handover the UE to an inter-frequency carrier which is not shared between macro-cells and HeNBs to mitigate this problem. However, there might not be any such carriers available in certain networks to which the UE may handover. Further, as the penetration of HeNBs increases, being able to efficiently operate HeNBs on the entire available spectrum might be desirable from a cost perspective. Even when a UE roams close to an allowed HeNB, it is possible that it experiences significant interference from the HeNB. Several other scenarios are likely too including the case of a UE connected one HeNB experiencing interference from an adjacent HeNB or a macro cell. The following types of interference scenarios have been identified.

HeNB (aggressor)→MeNB (victim) downlink (DL)
HUE (aggressor)→MeNB (victim) uplink (UL)
MUE (aggressor)→HeNB (victim) UL
MeNB (aggressor)→HeNB (victim) DL
HeNB (aggressor)→HeNB (victim) on DL
HeNB (aggressor)→HeNB (victim) on UL.

This disclosure discusses HeNB uplink (UL) interference in particular to the reception of PUCCH transmissions from UEs connected to both MeNB and HeNB in detail and proposes methods that enable a more effective co-channel/shared channel deployment of HeNBs in LTE Rel-9 systems and beyond.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention.

DETAILED DESCRIPTION

Figure 1:
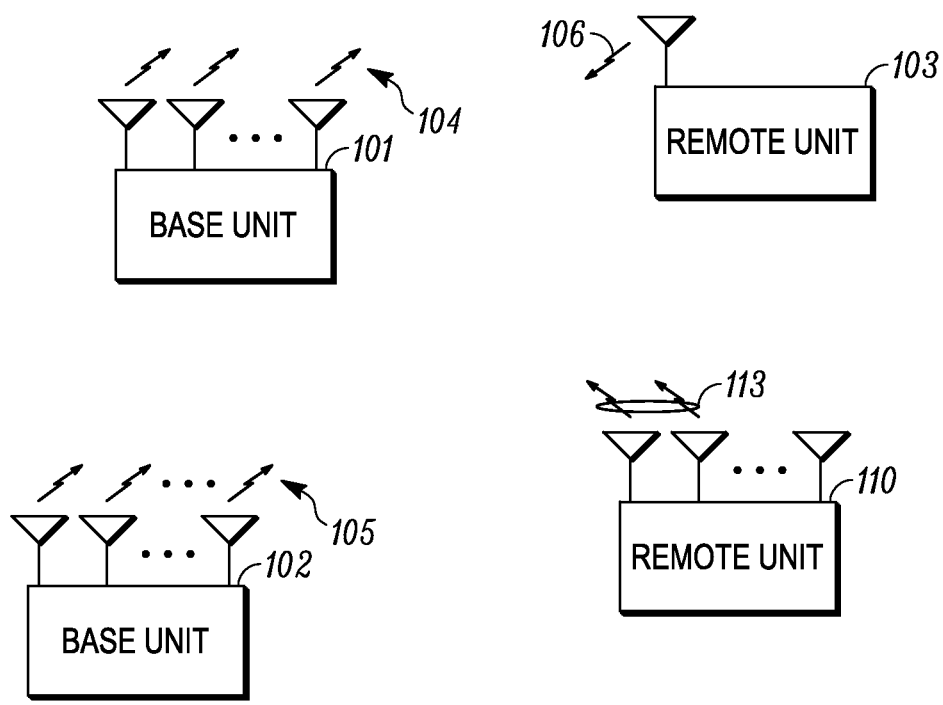
FIG. 1 shows a schematic diagram of a wireless communication system with two base stations serving their respective wireless terminals.

In FIG. 1, a wireless communication system 100 comprises one or more fixed base infrastructure units forming a network distributed over a geographical region. The base unit may also be referred to as an access point, access terminal, base, base station, Node-B, eNode-B, eNB, home-eNB, femto-cell, relay node (RN), pico-eNB or by other terminology used in the art. In FIG. 1, the one or more base units 101 and 102 serve a number of remote units 103 and 110 within a serving area, for example, a cell or a cell sector. The remote units may be fixed units or mobile terminals. The remote units may also be referred to as subscriber units, mobiles, mobile stations, users, terminals, subscriber stations, user equipment (UE), terminals, or by other terminology used in the art.

In FIG. 1, generally the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers. The base units are generally part of a radio access network that includes one or more controllers communicably coupled to one or more corresponding base units. The access network is generally communicably coupled to one or more core networks, which may be coupled to other networks, like the Internet and public switched telephone networks, among others. These and other elements of the access and core networks are not illustrated but they are well known generally by those having ordinary skill in the art.

In one implementation, the wireless communication system is compliant with the developing Long Term Evolution (LTE) of the 3GPP Universal Mobile Telecommunications System (UMTS) protocol (EUTRA) wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol. The present disclosure is not intended to be limited to the implementation of any particular wireless communication system architecture or protocol. The system may also comprise more than one neighboring system or overlapping systems each of which implements different wireless communication protocols, for example, EUTRA and a public safety communication protocol, etc.

Figure 5:
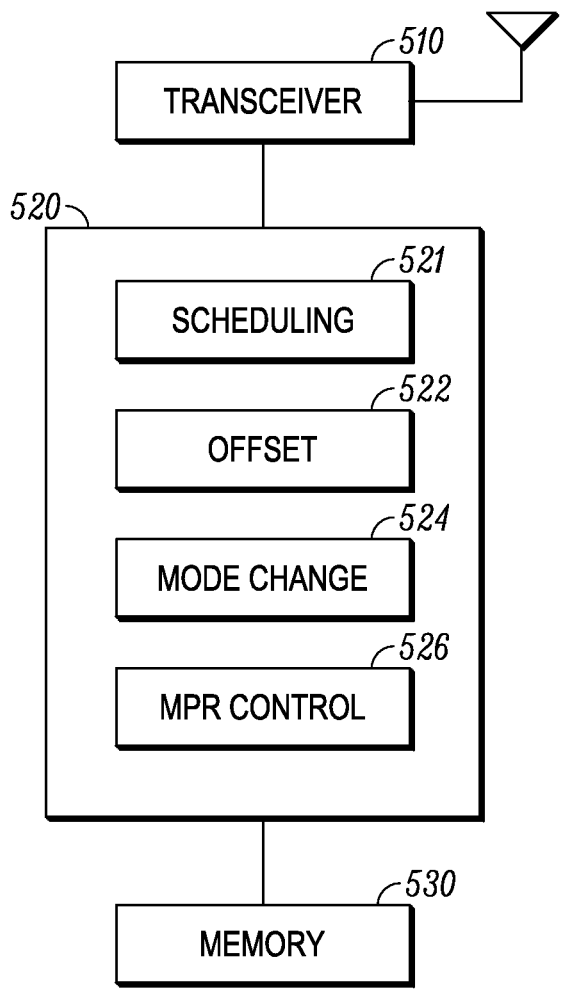
FIG. 5 illustrates a schematic diagram of an eNB for configuring wireless terminals for operation including scheduling of information and configuring the wireless terminal to transmit information on the uplink.

In FIG. 5, a wireless communication infrastructure entity 500 comprises a transceiver 510 communicably coupled a controller 520 for communicating with one or more user equipment within its coverage area. The controller is typically implemented as a digital processor controlled by software and/or firmware stored in memory 530. The controller is thus configured by the software/firmware to perform various functions. Alternatively, however the controller may be implemented as a hardware equivalent device or as a combination of hardware and software. The base unit includes scheduler functionality 521 for allocating resources to the UE as discussed more fully below. In one embodiment, the wireless communication infrastructure entity corresponds to one of the base units of FIG. 1.

In some systems, for example, EUTRA protocol systems, the base unit performs scheduling functions, which includes the allocation of time and/or frequency resources for data and control communications. In EUTRA systems, the scheduler allocates an uplink control channel to one or more UE for communicating hybrid ARQ feedback (ACK/NACK), channel quality feedback (CQI), a rank indicator (RI), a precoding matrix indicator (PMI) among other information. In other systems other control information may be communicated on the uplink control channel. In EUTRA systems, the uplink control information is communicated on a physical uplink channel (PUCCH). More generally uplink control information may be communicated on some other channel. In EUTRA, for example, control information may also be communicated on the physical uplink shared channel (PUSCH). In EUTRA, the PUCCH and PUSCH accommodate simultaneous uplink transmissions by multiple user equipment communicating in the wireless communication system. In EUTRA, such simultaneous communication is implemented by orthogonal coding of the uplink communications transmitted by the UE.

The PUCCH is implemented using a narrowband frequency resource within a wideband frequency resource wherein the PUCCH includes a pair of uplink control channels separated within the wideband frequency resource. The PUSCH may be configured similarly. Other uplink control channels used in other wireless protocols may be configured similarly. Locating the pair of uplink control channels at or near opposite edges of a wideband frequency resource provides diversity and avoids fragmentation of the resource block allocation space. Reducing fragmentation of this space permits allocation of contiguous resource blocks to a single UE to support relatively high data rates. In some implementations, diversity is achieved by alternately assigning a UE to one of the control channels at opposite edges of the band on a frame by frame basis.

To reduce out-of-band interference, the uplink control channel near edges of the wideband frequency resource may be relocated away from the edge and toward a medial portion of the band and/or a power limitation may be imposed on a UE transmitting on the uplink control channel. The relocation of the control channel may be static, semi-static (i.e., adjusted periodically) or it may be performed dynamically, for example, on a UE basis. The transmit power limitation, for example, maximum power reduction (MPR), imposed on UE transmitting on the uplink control channel is generally conditioned on the narrowband frequency resource (e.g., frequency and bandwidth) allocated for the uplink control channel. The interference may result from UE transmitting at high power which commonly occurs at or near the cell edge, though channel conditions away from the cell edge may also elicit higher transmit power. The interference may thus be exacerbated by relatively large cells. These and other schemes for offsetting the uplink control channel are discussed further below. In FIG. 5, the wireless communication infrastructure entity includes MPR functionality 526 for implementing these and related aspects of the disclosure.

Figure 2:
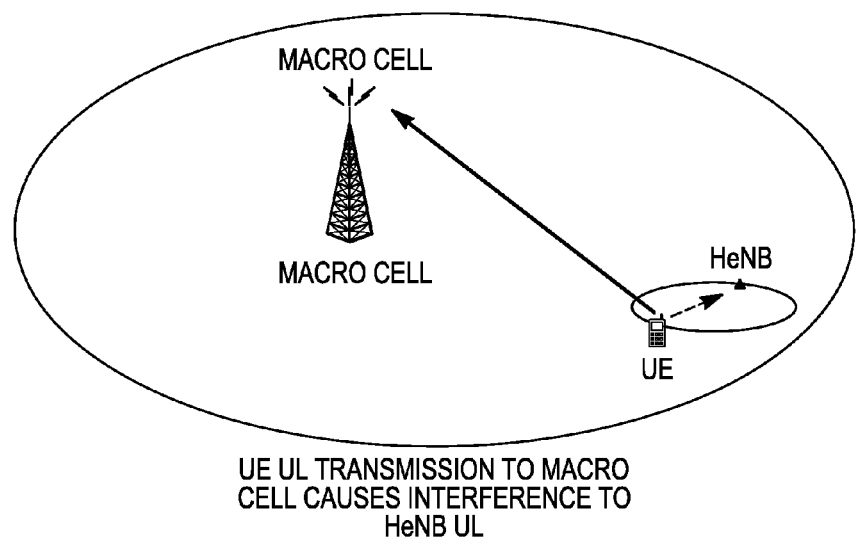
FIG. 2 illustrates a macro-cell with a user terminal (UE) and a home-base station (HeNB) in the macro-cell's coverage area.
Figure 3:
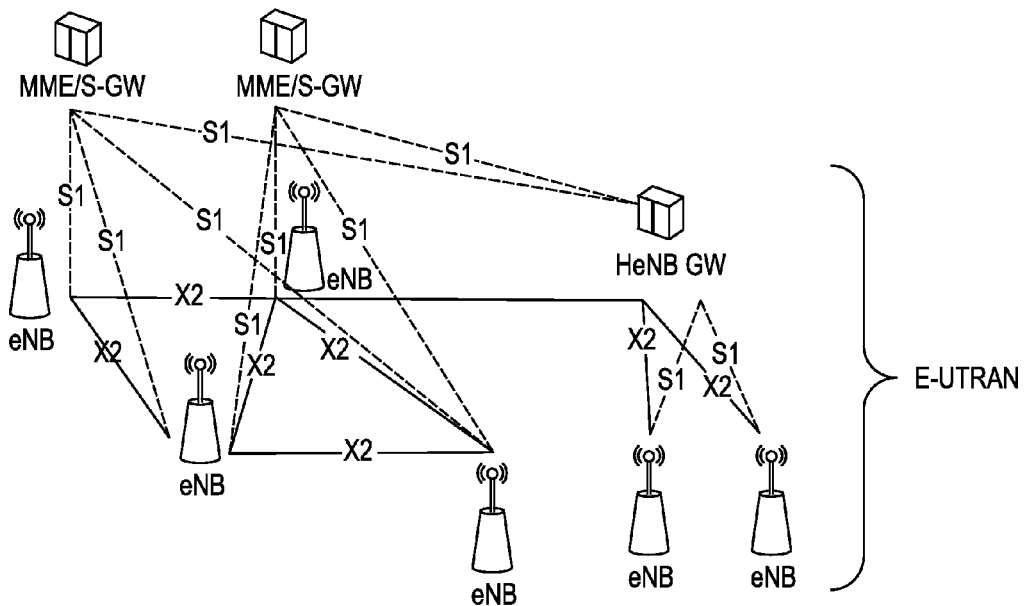
FIG. 3 shows a schematic diagram of an X2 interface architecture.

In a heterogeneous network, typically, a macro-eNB transmits at a much higher power (e.g., 46 dBm for 10 MHz) relative to HeNB (e.g., 20 dBm for home-eNBs and 30 dBm for a RN). Therefore, the coverage of macro-eNB is much larger. UEs connected to the macro-eNB that are at its cell edge, as shown in FIG. 2 for example, transmit on their uplink at close to their maximum allowed power and as a result can severely interfere with the UL of a HeNB/RN that is deployed towards the cell edge of the macro-eNB. In an analogous fashion, a UE connected to a HeNB/RN that is deployed close to a macro-eNB can interfere with the uplink of the macro-eNB. The reliability of the uplink control channel in E-UTRA or the physical uplink control channel (PUCCH) is critical as it transports CQI, ACK/NACK, SR, etc. The link throughput can become severely degraded if interference control/reduction techniques are not used for protecting the UL control.

Figure 6:
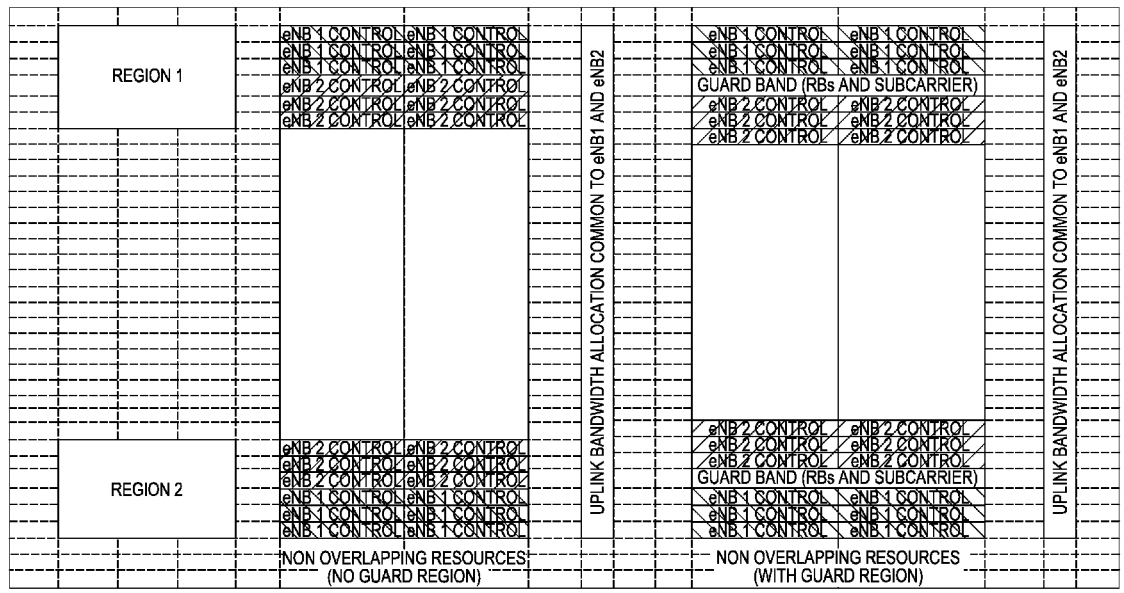
FIG. 6 illustrates an uplink bandwidth allocation for two wireless base stations showing control channel transmission on non-overlapping resources.

A method for orthogonalizing PUCCH transmission from macro-eNB and HeNB/RN is illustrated in FIG. 6. Uplink control signaling (CQI, ACK/NACK, etc.) reliability can be maintained for HeNB/RN and macro-eNB by using a PUCCH offset (so called "PUCCH over-provisioning") for orthogonal PUCCH assignments between the HeNB and MNB carriers. This approach provides for UEs to be configured with any UL carrier bandwidth (1.4/3/5/10/20 MHz, etc.). In one embodiment of interference coordination, a mechanism for signaling between macro-eNB and HeNB/RN, either directly or through a network controller to coordinate PUCCH locations used by macro-eNB and HeNB/femto-cell/RN so that their respective PUCCH regions do not overlap or overlap only over a prescribed/pre-determined amount is enabled. For the case of HeNB/RN coordinating with macro-eNBs, the information related to the PUCCH time/frequency resources (e.g., frequency offset) of one eNB (e.g., macro-eNB) can be determined by the other eNB (e.g. HeNB/RN) using one or more of the following four methods:

Exchange of a signal over X2 (i.e., directly between macro-eNB and HeNB/RN) or S1 interface (i.e., through a gateway/controller);

Transmission of signal over the air (OTA) for example on system information broadcast or on a dedicated message from one eNB to another. (A downlink receiver is necessary for this approach.);

Routing of a signal from a controller (e.g., a gateway or eNB) to the target (H)eNB through a UE using its uplink OTA; and Two eNBs can pre-determine the set of RBs that they would like to use for PUCCH semi-statically. Assume that the two eNBs do not overlap each others allocation. The PUCCH transmission from a UE connected to the first eNB (say, macro-eNB) can be received by second eNB (HeNB/RN). For example, the embedded Zadoff-Chu reference signal can be used to determine the presence/absence of PUCCH for each constituent RB. There are a certain number of allowed ZC sequences and a certain number of frequency shifts. Assuming that signal quality allows for reliable signal detection, since the ZC sequences used by the first eNB for its UEs is unknown to the second eNB a priori, the second eNB can hypothesize over the set of all possible sequences and possible frequency shifts. The detection complexity can be reduced if the second eNB has some information about the ZC sequence used by the first eNB so that it can restrict its search to a subset. This subset restriction helps improve detection reliability and reduces false alarm rate. Clearly, signaling over X2 or S1 or OTA is not necessary for this method. However, an UL receiver capable of implementing the above-mentioned detection method is necessary. Once the second eNB determines the PUCCH allocation (i.e., set of RBs) of the first eNB, it can then choose a set of RBs that are orthogonal or only partially overlap for its own UEs.

It would be desirable for the macro-eNB to signal an offset to all HeNBs within its coverage area in order that transmissions from UEs connected to HeNBs do not cause interference at the macro-eNB receiver (e.g., a HeNB deployed in close range of a macro-eNB). Conversely, a macro-eNB UE that is at the cell edge and therefore transmitting close to its maximum transmit power can interfere severely with a HeNB UE and the signaled offset can be made use of to mitigate interference. Alternately, a HeNB gateway can signal over S1 or X2 or OTA or some other interface, the offsets that each HeNB should use, thus providing the capability of configuring orthogonal PUCCH transmissions in neighboring HeNBs thereby avoiding HeNB (aggressor) to HeNB (victim) interference on the uplink. In FIG. 5, the wireless communication infrastructure entity includes offset functionality 522 for implementing these and related aspects of the disclosure.

One option for the HeNBs is to not allocate PUCCH resources on edge RBs (reverse of that shown in FIG. 6) using over-provisioning. A typical macro-eNB deployment is likely to have PUCCH transmission on the band-edges to maximize the number of contiguous RBs that can be allocated to PUSCH. However, unlike macro-eNBs, utilizing the full uplink bandwidth may not be critical for HeNBs as they serve only a few users at a time. Therefore, the PUCCH resources in HeNBs can be "pulled" inward. The edge RBs not used by the HeNBs can be used by the macro-eNB for PUCCH for its UEs. Also, the macro-eNB, being aware of the RBs used by HeNBs in its coverage area, can schedule users that are close-by (i.e., UEs that have small pathloss relative to macro-eNB) for PUSCH on RBs that overlap with HeNB UE PUCCH region. This results in reduced interference from macro-eNB UEs to HeNB UE PUCCH. The HeNBs not allocating PUCCH on some of the edge-most RBs automatically provide additional out-of-band emission protection (e.g., when the adjacent band owned by a different operator).

FIG. 6 illustrates a first set of RBs configured for uplink control channels (PUCCH region 1 corresponding to the lower-edge of the band and region 2 corresponding to the upper-edge of the band) located at opposite edges of the band in a first base station (eNB1). Assume for illustration purposes that eNB1 configures three RBs for use among its UEs. A second base station (eNB2) configures a second set of RBs non-overlapping, at least in part, with the first set of RBs for use by its UEs. When the UL timing between UEs connected to the two base stations are aligned (or within a cyclic prefix length), and the two sets of RBs are non-overlapping in frequency domain, the transmission of a UE connected to eNB1 does not interfere with the transmission of a UE connected to eNB2 because of orthogonality. However, the uplink timing of the UEs connected to the two base stations are typically not aligned or not within the cyclic prefix. In such scenarios, the interference between the two such transmissions can be mitigated by creating a guard region either with one or more RBs or with one or more subcarriers between the two PUCCH that is configured for non-transmission by any UE connected to eNB1 or eNB2.

In one embodiment, the uplink control channel offset is specified in terms of the number of resource blocks that the entire resource region of the PUCCH is offset. In EUTRA, the resource region is specified in terms of system variables including the number of UE's, traffic per UE, etc. and is computed by the network. Thus in FIG. 6, the entire PUCCH region (including region 1 and region 2) for eNB1 is offset 13 resource blocks. In an alternative embodiment, the uplink control channel offset is specified in terms of the number of resource blocks within the resource region of the PUCCH that the assignment or allocation of control channel resources begins. In a similar fashion, the PUCCH region 1 and region 2 for eNB2 is offset 10 resource blocks. Each UE is assigned a PUCCH which occurs in a PRB in each PUCCH region (PUCCH region 1 and region 2 are as shown in FIG. 6) denoted as a PUCCH PRB pair as shown in FIG. 6. Each PUCCH PRB pair can support some maximum number of PUCCH depending on the particular PUCCH format supported in the PUCCH PRB pair. The PUCCH numbering starts on the first PUCCH PRB in a PUCCH region. A PUCCH PRB may have up to 12 or 18 PUCCHs depending on the PUCCH format supported such that the first PUCCH PRB would have. PUCCH numbering proceeds with each subsequent PUCCH PRB in a PUCCH region.

The PUCCH region can have more PUCCH PRBs than the actual number of PUCCH PRBs assigned the PUCCH. This is referred to as over provisioning. In this case the lowest channel number used for UE PUCCH assignments (i.e., a UE persistently scheduled PUCCH assignments) might skip the first N1 channels in the PUCCH region and start at a channel number corresponding to a PRB occurring further into the PUCCH region and thereby skipping the first K1 PRBs in the PUCCH region. Given each PUCCH PRB pair supporting 18 PUCCHs then, for example, with the only PUCCH numbers assigned being >N1 where N1=K1×18 means that each PUCCH corresponding to its assigned PUCCH number would occur in PRB number K1+1 or greater in the PUCCH region. Given the PUCCH regions are the same size in terms of PRBs and use the same PUCCH numbering scheme then a UE assigned a PUCCH number can determine which PRB in either PUCCH region its PUCCH resides. In one embodiment, different PUCCH number offsets are used by the two base stations eNB1 and eNB2 in either PUCCH region such that the PUCCH can map to arbitrary sets of PRBs in each PRB region from which PUCCH PRB pairs are formed as shown in FIG. 6. For example, in PUCCH regions for eNB1 the PUCCH number i1 is given by i1=j+J1*NPUCCH_PER_PRB with PUCCH number offset J1*NPUCCH_PER_PRB and in eNB2 the PUCCH region is given by i2=j+J2*NPUCCH_PER_PRB with PUCCH number offset J2*NPUCCH_PER_PRB. Note that j ranges from 0 to maximum_PUCCH_channel_number−1. The offsets J1 and J2 are configured for use in UEs by eNB1 and eNB2 respectively with or without network assistance.

Further offsets to restrict the range of i can be signaled by eNB1 or eNB2 or both. In one embodiment, the parameter "maximum_PUCCH_channel_number" can be different for eNB1 and eNB2.

In an alternative embodiment, J1 gives the PRB offset relative to the edge PRB of the PUCCH region 1 and region 2 in eNB1 where PUCCH numbering starts which in this example is labeled as the first PRB in PUCCH region 1 and region 2 in eNB1. Similarly, J2 gives the PRB offset relative to the edge PRB of the PUCCH region 1 and region 2 in eNB2 where PUCCH numbering starts which in this example is labeled as the first PRB in PUCCH region 1 and region 2.

In most or all such embodiments that permit offsetting of the PUCCH resource, including the case of over-provisioning, the network is enabled to initiate uplink data transmission in frequency resources not used by PUCCH transmissions. Also, while in the descriptions of the embodiments the offset is generally defined with respect to the edge of the band, other offsets, such as with respect to another arbitrary reference such as the center or any other predefined reference, may be used and are functionally equivalent.

The uplink control channel can also include a third uplink control channel, which is located within the wideband frequency resource between the pair of outmost uplink control channels. In FIG. 6, the third control channel resource could be located in a resource block region between PUCCH regions 1 and 2 away from the neighboring band subject to the interference. The use of a third control channel resource between the pair of control channel resources provides the scheduler the flexibility to assign the third control channel to UE transmitting at higher power, or meeting some other criteria such as excessive out of bands emissions, if desired.

According another embodiment, the location of the uplink control channel may be changed by changing the uplink control channel feedback mode. In EUTRA systems, for example, the feedback mode may be changed from PUCCH feedback mode to PUSCH feedback mode. In FIG. 5, the wireless communication infrastructure entity includes mode change functionality 524 for implementing these and related aspects of the disclosure. In other words, feedback information normally communicated on the PUCCH could be communicated on the PUSCH. The mode change may be triggered based on various conditions. For example, a change from PUCCH feedback mode to PUSCH feedback mode may be triggered when the interference on the PUCCH RBs as observed from the eNB increases beyond a threshold or equivalently, the uplink channel quality measured drops below a certain threshold. In another embodiment, a change can be triggered when an estimated transmit power level of the UE rises above a threshold, among other conditions. In one implementation, the network configures the set of RBs that the eNB should use. However, if the interference is high due to neighbor cell transmissions or if the eNB does not prefer to switch back to PUSCH feedback mode (e.g., periodic CQI reporting is desired with reporting on PUCCH), the eNB can signal a request to the network asking it to change the set of RBs for uplink PUCCH transmission that the network had previously configured for the eNB to use. This signal can be routed either on X2 or S1.

Figure 4:
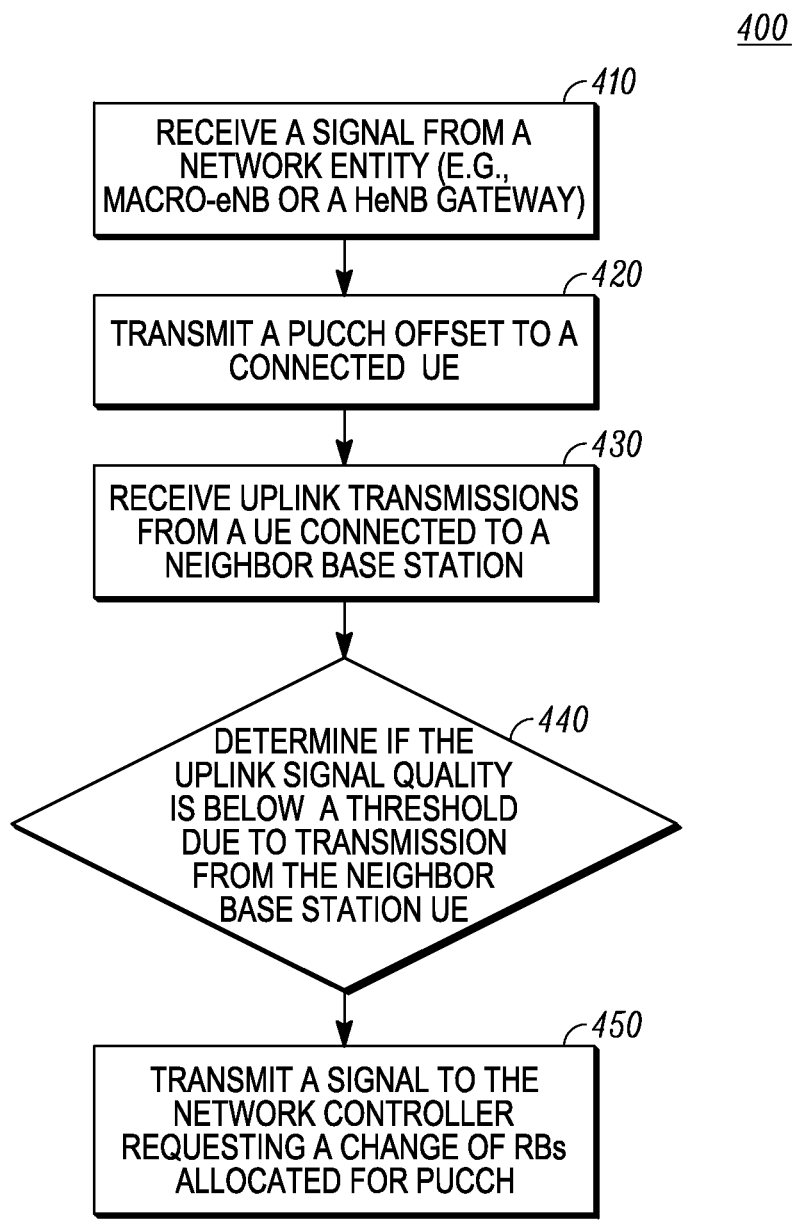
FIG. 4 illustrates a process flow diagram of a wireless network transporting uplink control channel resource allocation to a wireless base station.

In the process flow diagram 400 of FIG. 4, at 410, a wireless communication device receives a signal from a network entity. The entity may be a Macro-eNB or a Home eNB gateway. At 420, the wireless device transmits a PUCCH offset to a connected UE. At 430, the wireless device receives uplink transmissions from a UE connected to a neighboring base station. At 440, the device determines whether the uplink signal quality is below a threshold due to transmissions from the neighboring base station or UE. At 450, the wireless device transmits a signal to a network controller requesting a change of RBs allocated for the PUCCH.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method comprising:
receiving, at a wireless base station, an uplink control channel transmission from a first UE,
wherein the first UE not connected to the base station, and
wherein a second UE is connected to the base station;
determining the time-frequency resources used by the first UE for the uplink control channel;
based on the determination, obtaining new uplink time-frequency resources, wherein the new time-frequency resources are different from time-frequency resources used by the first UE for the uplink control channel; and
providing the new uplink time-frequency resources to the second UE.

2. The method of claim 1, further comprising:
determining the interference from the first UE resulting from the uplink transmission, wherein the obtaining step is based, at least in part, on the determined interference.

3. The method of claim 2, wherein determining the interference comprises determining whether the interference from the first UE is above a predetermined threshold.

4. The method of claim 1, wherein the obtaining step comprises the wireless base station determining the new time-frequency uplink resources.

5. The method of claim 1, wherein the obtaining step comprises:
requesting new time-frequency resources from a network; and
receiving the new time-frequency resources from the network.

6. A method for reducing interference experienced by a closed-subscriber group home-base station resulting from an uplink control channel transmission from a first UE, wherein the first UE is not connected to the wireless home-base station, but is connected to a wireless macro base station, the method comprising:
the home-base station receiving the uplink control channel transmission from the first UE;
the home-base station determining whether the interference resulting from the uplink control channel transmission is above a predetermined threshold;
the home-base station obtaining time-frequency resources based on the determining step;
the home-base station providing the time frequency resources to the second UE, wherein the provided time-frequency resources are at least partially different from time-frequency resources used by the first UE.

7. The method of claim 6, wherein the obtaining step comprises the home-base station determining the provided time-frequency resources.

8. The method of claim 6, wherein the obtaining step comprises:
the home-base station requesting time-frequency resources from a network;
the home-base station receiving, in response to the requesting step, time-resources from the network, wherein the provided time-frequency resources are the received time-frequency resources.

9. The method of claim 6, further comprising:
determining the time-frequency resources used by the uplink control channel of the first UE;
determining an offset for the time-frequency resources to be provided to the second UE such that the time-frequency resources used by the uplink control channel of the first UE only partially overlap with the time-frequency resources used by the uplink control channel of the second UE,
wherein providing the time-frequency resources to the second UE comprises providing the offset value to the second UE.

* * * * *